June 23, 1942.   R. L. OVERSTREET   2,287,193
PROCESS FOR MAKING CLOSED-CELL CELLULAR RUBBER
Filed March 4, 1939
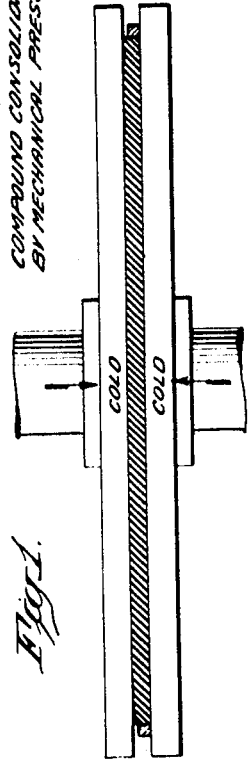
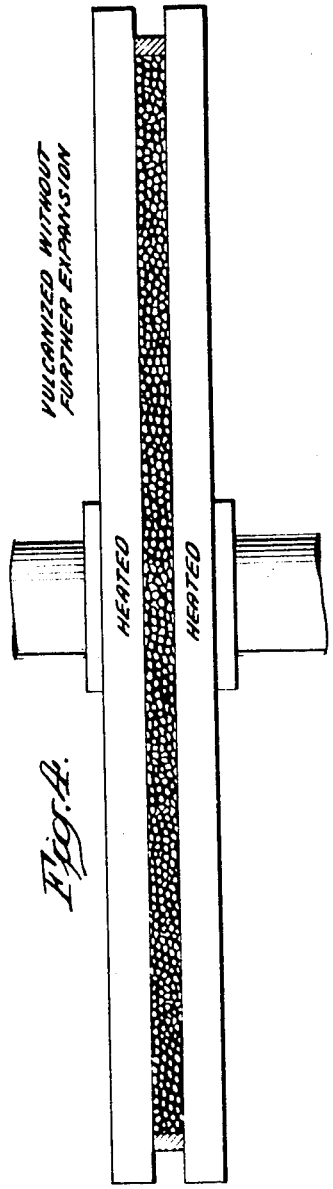
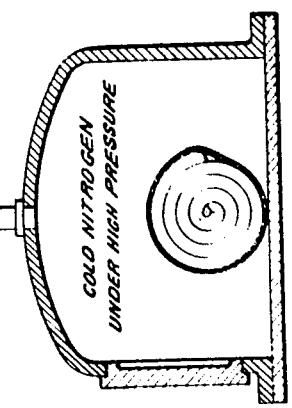
INVENTOR
Robert L. Overstreet
BY
ATTORNEY Patented June 23, 1942

2,287,193

UNITED STATES PATENT OFFICE

2,287,193

PROCESS FOR MAKING CLOSED-CELL CELLULAR RUBBER

Robert L. Overstreet, Bedford, Va., assignor, by mesne assignments, to Salta Corporation, Jersey City, N. J., a corporation of Delaware Application March 4, 1939, Serial No. 259,732

9 Claims. (Cl. 18—53)

This invention relates to a process for making closed-cell cellular rubber.

In the so-called gassing process for making closed-cell cellular rubber by impregnating a mass of rubber compound with an inert gas under high pressure, it has heretofore been considered necessary partially to vulcanize the mass either during the impregnation or before the impregnation in order that the compound may acquire sufficient strength to confine the gas in closed cells during the final vulcanization.

The method which I have invented permits the making of closed-cell cellular rubber by gassing without preliminary vulcanization. By eliminating the necessity for two-stage vulcanization, it simplifies the manufacture and makes it more economical.

In accordance with my invention, closed-cell cellular rubber is made by first consolidating a mass of rubber compound by the application of mechanical pressure, then subjecting the compound to a neutral gas such as nitrogen under high pressure, then allowing the compound to expand and finally vulcanizing the compound without further expansion. The entire vulcanization takes place in the last step of my process, and no heat is used in the other steps. The method may be used to make either soft or hard closed-cell cellular rubber.

I will explain my method in detail in connection with the accompanying diagrammatic drawing which illustrates the successive steps of the method:

The first step consists in consolidating the rubber compound by mechanical pressure. It may be carried out as indicated in Fig. 1 by placing a sheet of the compound in a frame slightly thinner than the sheet in a hydraulic press and applying mechanical pressure of the order of 500 pounds to the square inch for a period of several minutes. The pressure reduces the thickness of the sheet of compound, by one-sixth or thereabouts, and consolidates the compound, placing it in condition to retain gas without vulcanization.

The second step consists in subjecting the compound to a neutral gas under high pressure. This step may conveniently be carried out as illustrated in Fig. 2 by placing the compound in an autoclave in which it is subjected to nitrogen gas at a pressure of about 4800 pounds per square inch for a period of several hours. The compound is most desirably confined, for example, in a roll of canvas as shown in Fig. 2, while it is in the autoclave, so that it will not expand in the autoclave when the gas pressure is removed.

The third step consists in allowing the compound to expand. The gas pressure is released, the compound is removed from the autoclave, and the roll of canvas or other confining means is released. The compound then expands to many times its original volume, as indicated in Fig. 3.

The final step consists in vulcanizing the rubber compound without further expansion. This may be accomplished by placing the expanded compound in a mold, retaining the mold closed and applying heat, as indicated in Fig. 4. In order that there may be no chance of further expansion in this step, it is desirable to make the mold slightly smaller than the expanded compound, so that the compound is slightly compressed in placing it in the mold. After vulcanization, the mold is cooled before it is opened, so that when the mold is opened the vulcanized mass has no tendency to further expansion.

The product is a closed-cell cellular rubber and may be soft or hard in accordance with the amount of sulfur used in the compound and the length of the vulcanization.

Specific examples of my method are as follows:

EXAMPLE 1.—*Cellular soft rubber*

The compound used has the following composition:

| | Grams |
|---|---|
| Masticated smoked sheets (BD-1) | 680 |
| Light calcinated magnesium | 57.5 |
| Lithopone | 57.5 |
| Zinc oxide | 27.5 |
| Agerite powder | 8.75 |
| AC-I (1:16 Captax M. B.) | 10.625 |
| AC-II (1:8 DPG M. B.) | 38.75 |
| Paraffin wax | 28.125 |
| Petrolatum | 30. |
| Sulfur | 42.5 |

The compound is mixed, calendered and sheeted in the usual manner, and the calendered sheet is allowed to rest approximately 24 hours. A sheet having a thickness of $\frac{7}{32}''$ is placed in a frame having a thickness of $\frac{3}{16}''$ and placed between the cold platens of a hydraulic press. A pressure on the order of 500 pounds is applied for a period of 10 minutes.

The sheet is then removed, wrapped in canvas, placed in an autoclave, and nitrogen gas is introduced into the autoclave to a pressure of 4800 pounds per square inch. The sheet is left under this nitrogen pressure for a period of 14 hours.

When the sheet is removed from the autoclave and released from the canvas, it immediately expands to a thickness of about 5/8" and about doubles in length and width. It is then forced into a mold or a frame having a thickness of 1/2" and slightly shorter and narrower than the expanded sheet. It may be forced into the frame by placing it in the frame between the platens of a hydraulic press. In this case, the platens and the frame cooperate in forming a confining mold. While thus confined, it is vulcanized for a period of 18 minutes at the temperature of 70 pounds steam pressure. After the vulcanization, the platens are cooled to cool the vulcanized rubber. They are then separated, and the rubber is removed. The resulting product is a sheet of closed-cell cellular soft rubber 1/2" in thickness and weighing about 8 pounds per cubic foot.

EXAMPLE 2.—*Cellular hard rubber*

The compound used has the following composition:

| | Pounds |
|---|---|
| Smoked sheet crude rubber | 48 |
| Sulphur | 24 |
| Light calcined magnesia | 3 |
| Asphaltum | 12 |
| Gilsonite | 12 |
| Captax | 1 |

The procedure is the same as that described in Example 1 except that the vulcanization is for a longer period and at a higher temperature. It is effected by a temperature of 90 pounds steam pressure maintained for 1 1/4 hours.

The resulting product is a board of closed-cell cellular hard rubber weighing about 6 pounds per cubic foot.

It will be understood that my invention is by no means limited to the specific examples which have been described.

What I claim is:

1. The method of manufacturing closed-cell cellular rubber, which comprises consolidating a mass of rubber compound by mechanical pressure while cold, then subjecting the compound to a neutral gas under a pressure of several thousand pounds per square inch, relieving the compound of the gas pressure and permitting it to expand, and then vulcanizing the compound by heat under conditions which prevent further expansion thereof.

2. In a method of manufacturing closed-cell cellular rubber, the steps of applying to a mass of rubber compound mechanical pressure of the order of 500 pounds to the square inch, then subjecting the compound to neutral gas under a pressure of several thousand pounds per square inch, relieving the compound of gas pressure and permitting it to expand.

3. The method of manufacturing closed-cell cellular rubber, which comprises consolidating a mass of rubber compound while cold by mechanical pressure, subjecting the consolidated compound while cold to neutral gas under a pressure of several thousand pounds per square inch, relieving the compound of gas pressure and permitting it to expand, and vulcanizing the expanded compound by heat under conditions which prevent further expansion thereof.

4. The method of manufacturing closed-cell cellular rubber, which comprises consolidating a mass of rubber compound by mechanical pressure, gassing the consolidated compound with a neutral gas under a pressure of several thousand pounds per square inch and then permitting it to expand, confining the expanded compound, and vulcanizing the confined compound.

5. The method of manufacturing closed-cell cellular rubber, which comprises consolidating a mass of rubber compound while cold by mechanical pressure, subjecting the consolidated compound to gas under high pressure, relieving the compound of gas pressure and permitting it to expand, slightly compressing and confining the expanded compound, and vulcanizing the confined compound.

6. The method of manufacturing closed-cell cellular rubber, which comprises consolidating a mass of rubber compound while cold by mechanical pressure, subjecting the consolidated compound while cold to gas under high pressure, relieving the compound of gas pressure and permitting it to expand, slightly compressing and confining the expanded compound, vulcanizing the confined compound by heat, cooling the vulcanized compound, and releasing the cooled compound from confinement.

7. The method of manufacturing closed-cell cellular rubber which comprises treating a mass of rubber compound to increase its rupture resisting characteristics sufficiently to prevent rupturing thereof during expansion and inflating it by the expansion of separate gas bubbles within it, slightly compressing the inflated compound, confining the slightly compressed compound, and vulcanizing the confined compound.

8. In the gassing method of making expanded rubber in which a rubber compound is treated to increase its rupture resisting characteristics sufficiently to prevent rupturing thereof during expansion, and is subjected to a neutral gas under heavy pressure and the gas pressure is thereafter released to expand the rubber compound and the rubber compound is thereafter heated until it is completely vulcanized, the improvement which consists in treating the rubber compound to increase its rupture resisting characteristics sufficiently to prevent rupturing thereof during expansion by consolidating it by mechanical pressure.

9. In the gassing method of making expanded rubber in which a rubber compound is treated to increase its rupturing resisting characteristics sufficiently to prevent rupturing thereof during expansion, and is subjected to a neutral gas under heavy pressure and the gas pressure is thereafter released to expand the rubber compound and the rubber compound is thereafter heated until it is completely vulcanized, the improvement which consists in slightly compressing the rubber compound after gas pressure thereon is released and the rubber compound has expanded and before the beginning of said heating, and confining the slightly compressed rubber compound during said heating.

ROBERT L. OVERSTREET